(12) United States Patent
Yang et al.

(10) Patent No.: US 12,700,080 B2
(45) Date of Patent: Aug. 4, 2026

(54) METHOD AND APPARATUS FOR AUTOMATIC OPTICAL INSPECTION

(71) Applicant: Robert Bosch GmbH, Stuttgart (DE)

(72) Inventors: Hao Yang, Shanghai (CN); Jing Xu, Shanghai (CN); Jiayi Lu, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 18/290,769

(22) PCT Filed: Jul. 30, 2021

(86) PCT No.: PCT/CN2021/109671
§ 371 (c)(1),
(2) Date: Jan. 20, 2024

(87) PCT Pub. No.: WO2023/004767
PCT Pub. Date: Feb. 2, 2023

(65) Prior Publication Data
US 2024/0370991 A1     Nov. 7, 2024

(51) Int. Cl.
*G06T 7/00*      (2017.01)
*G06V 10/82*     (2022.01)
*G06V 20/70*     (2022.01)

(52) U.S. Cl.
CPC ............ *G06T 7/0008* (2013.01); *G06V 10/82* (2022.01); *G06V 20/70* (2022.01); *G06T 2207/30108* (2013.01)

(58) Field of Classification Search
USPC ......................................................... 382/100
See application file for complete search history.

(56) References Cited

U.S. PATENT DOCUMENTS

| | | | |
|---|---|---|---|
| 2019/0213725 A1* | 7/2019 | Liang ................... | G06V 30/194 |
| 2019/0287230 A1* | 9/2019 | Lu ......................... | G06N 3/0895 |
| 2020/0294224 A1 | 9/2020 | Shaubi et al. | |

FOREIGN PATENT DOCUMENTS

| | | |
|---|---|---|
| WO | 2019182922 A1 | 9/2019 |

OTHER PUBLICATIONS

International Search Report corresponding to PCT Application No. PCT/CN2021/109671, mailed Feb. 8, 2022 (English language document) (4 pages).

(Continued)

*Primary Examiner* — Jacky X Zheng
(74) *Attorney, Agent, or Firm* — Maginot, Moore & Beck LLP

(57) ABSTRACT

A method for automatic optical inspection includes (i) receiving an image of an object, (ii) classifying the image of the object as one of a plurality of categories by a classification model, (iii) determining a label for the image of the object as being qualified if the category obtained by the classification model is a first category, and (iv) performing defect measurement for the image by a segmentation model and determining a label for the image as being qualified or unqualified based on the defect measurement obtained by the segmentation model if the category obtained by the classification model is a second category.

17 Claims, 7 Drawing Sheets

100

(56)        References Cited

OTHER PUBLICATIONS

Staar et al., "Anomaly detection with convolutional neural networks for industrial surface inspection," Procedia Cirp, Jan. 1, 2019 (Jan. 1, 2019), pp. 484489, vol. 79, XP055649208, ISSN: 2212-8271, DOI: 10.1016/j.procir.2019.02.123.

He et al., "Deep Residual Learning for Image Recognition", Proceedings of the IEEE conference on computer vision and pattern recognition, pp. 770-778, 2016.

Szegedy et al., "Going Deeper with Convolutions", Proceedings of the IEEE conference on computer vision and pattern recognition, pp. 1-9, 2015.

Tan et al., "EfficientNet: Rethinking Model Scaling for Convolutional Neural Networks", Proceedings of the 36th International Conference on Machine Learning, pp. 6105-6114, PMLR 97, 2019.

Mackay, "Bayesian Methods for Adaptive Models", California Institute of Technology, Pasadena, California, 1992.

Blundell et al., "Weight Uncertainty in Neural Networks", Proceedings of the 32nd International Conference on Machine Learning, Lille, France, pp. 1613-1622, PMLR, 2015.

Lakshminarayanan et al., "Simple and Scalable Predictive Uncertainty Estimation using Deep Ensembles", arXiv preprint arXiv: 1612.01474, 31st Conference on Neural Information Processing Systems (NIPS 2017), Long Beach, CA, 2016.

Long et al., "Fully Convolutional Networks for Semantic Segmentation", Proceedings of the IEEE conference on computer vision and pattern recognition, pp. 3431-3440, 2015.

Ronneberger et al., "U-net: Convolutional Networks for Biomedical Image Segmentation", International Conference on Medical Image Computing and Computer Assisted Intervention, pp. 234-241, Springer, 2015.

Chen et al., "DeepLab: Semantic Image Segmentation with Deep Convolutional Nets, Atrous Convolution, and Fully Connected CRFs", IEEE Transactions on Pattern Analysis and Machine Intelligence, 2017.

Wang et al., "Deep High-Resolution Representation Learning for Visual Recognition", IEEE Transactions on Pattern Analysis and Machine Intelligence, Mar. 2020.

Scholkopf et al., "Support Vector Method for Novelty Detection", NIPS, vol. 12, pp. 582-588, 1999.

Liu et al., "Isolation Forest", 2008 Eighth IEEE International Conference on Data Mining, pp. 413-422, IEEE, 2008.

Vincent et al., "Extracting and Composing Robust Features with Denoising Autoencoders", Proceedings of the 25th International Conference on Machine Learning, Helsinki, Finland, pp. 1096-1103, 2008.

Kanungo et al., "An Efficient k-means Clustering Algorithm: Analysis and Implementation", IEEE Transactions on Pattern Analysis and Machine Intelligence, vol. 27, No. 7, pp. 881-892, Jul. 2002.

Neal, "Bayesian Learning for Neural Networks", Lecture Notes in Statistics, vol. 118, Springer Science & Business Media, 1996.

* cited by examiner

METHOD AND APPARATUS FOR AUTOMATIC OPTICAL INSPECTION

This application is a 35 U.S.C. § 371 National Stage Application of PCT/CN2021/109671, filed on Jul. 30, 2021, the disclosure of which is incorporated herein by reference in its entirety.

Aspects of the present disclosure relate generally to optical inspection, and more particularly, to inspecting qualification of a product by using artificial intelligence (AI) based automatic optical inspection.

BACKGROUND

In manufacture of products such as mechanical or electronic products, defects such as pits, abrasions, scratches and so on may occur due to various factors such as unperfect manufacturing condition, accidental mechanical failure and so on. These defects increase the costs of manufacture, shorten the service life of manufactured products, and even cause substantial harm to users. For example, a defect in a crucial mechanical or electronic component of a car may be of potential safety problem. Hence, detecting defects of products is a crucial work in order to improve the quality of the manufactured products.

Automatic defect-detection technology has obvious advantages over manual detection, it can not only reduce the workload of manual inspectors, but also improve the stability and performance of the inspection process while adapting to various working environments which are not suitable for human.

A challenge for automatic defect-detection is to keep the escape rate (the flow of bad products to the market) at a low level, and not to issue too many false alarms (good products are misreported as bad products) during the production process to affect production efficiency.

SUMMARY

The disclosure proposes a novel framework for automatic optical inspection of an object. By taking advantage of complementary functions of multiple machine learning based neural network models in the framework, the requirements for escape rate and false alarm rate can be better balanced. Particularly, the false alarm rate may be decreased significantly while ensuring low escape rate.

According to an embodiment, there provides a method for automatic optical inspection, comprising: receiving an image of an object; classifying the image of the object as one of a plurality of categories by a classification model; determining a label for the image of the object as being qualified if the category obtained by the classification model is a first category; performing defect measurement for the image by a segmentation model and determining a label for the image as being qualified or unqualified based on the defect measurement obtained by the segmentation model if the category obtained by the classification model is a second category.

According to an embodiment, the method may further comprise performing anomaly detection for the image by an anomaly detection model and determining a label for the image as being qualified or unqualified based on the anomaly detection obtained by the anomaly detection model if the category obtained by the classification model is a third category.

According to an embodiment, there provides an apparatus for automatic optical inspection, comprising: a classification module for classifying an image of an object as one of a plurality of categories; a decision module for determining a label for the image of the object as being qualified if the category obtained by the classification module is a first category; a segmentation module for performing defect measurement for the image if the category obtained by the classification module is a second category, wherein the decision module being further for determining a label for the image as being qualified or unqualified based on the defect measurement obtained by the segmentation module.

According to an embodiment, the apparatus further comprises an anomaly detection module for performing anomaly detection for the image if the category obtained by the classification module is a third category, wherein the decision module being further for determining a label for the image as being qualified or unqualified based on the anomaly detection obtained by the anomaly detection module.

According to an embodiment, there provides an apparatus for automatic optical inspection, comprising: an optical unit configured for capturing an image of an object; one or more processors; and one or more storage devices storing computer-executable instructions that, when executed, cause the one or more processors to perform the operations of the method as mentioned above as well as to perform the operations of the method according to aspects of the disclosure.

According to an embodiment, there provides a computer system, which comprises one or more processors and one or more storage devices storing computer-executable instructions that, when executed, cause the one or more processors to perform the operations of the method as mentioned above as well as to perform the operations of the method according to aspects of the disclosure.

According to an embodiment, there provides one or more computer readable storage media storing computer-executable instructions that, when executed, cause one or more processors to perform the operations of the method as mentioned above as well as to perform the operations of the method according to aspects of the disclosure.

According to an embodiment, there provides a computer program product comprising computer-executable instructions that, when executed, cause one or more processors to perform the operations of the method as mentioned above as well as to perform the operations of the method according to aspects of the disclosure.

By using the deep learning based automatic optical inspection framework, the escape rate and false alarm rate of the defect detection of product may be decreased, and accordingly the overall accuracy of defect detection may be achieved while industry criterions being met. Other advantages and enhancements are explained in the description hereafter.

BRIEF DESCRIPTION OF THE DRA WINGS

The disclosed aspects will hereinafter be described in connection with the appended drawings that are provided to illustrate and not to limit the disclosed aspects.

DETAILED DESCRIPTION

The present disclosure will now be discussed with reference to several exemplary implementations. It is to be understood that these implementations are discussed only for enabling those skilled in the art to better understand and thus implement the embodiments of the present disclosure, rather than suggesting any limitations on the scope of the present disclosure.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the disclosure.

Figure 1:
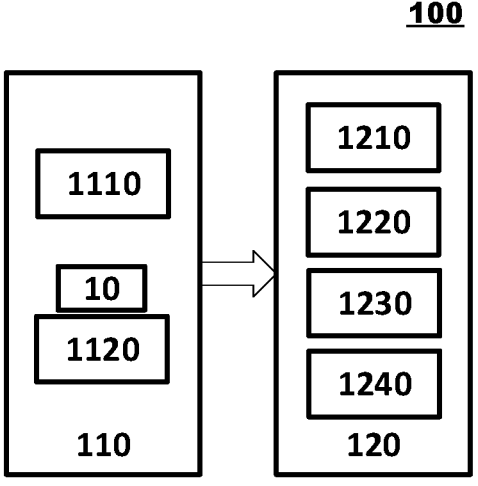
FIG. 1 illustrates an exemplary apparatus for automatic optical inspection according to an embodiment of the disclosure.

FIG. 1 is a block diagram illustrating an exemplary apparatus for automatic optical inspection according to an embodiment of the disclosure.

The optical inspection apparatus 100, which may also be referred to as vision inspection apparatus, may be an apparatus for inspecting finished or semi-finished products, may be deployed on the manufacturing line to detect products or components during the manufacturing process, may be part of the manufacturing line, or may be deployed in a place separate from the manufacturing line.

The optical inspection apparatus 100 may include a front end 110, which may also be referred to as a vision system 110. The front end 100 includes an imaging unit 1110 and an object carrier unit 1120. The imaging unit 1110 may capture images of an object 10 placed on the carrier unit 1120. In an example, the imaging unit 1110 may include sensing elements and optical focusing system which cooperate to realize the imaging of the object 10.

An example of the carrier unit 1120 may be a mechanical platform, a mechanical arm or the like which may hold the object 10 so as for the imaging unit 1110 to capture an image for the object. In an example, the imaging unit 1110 and the carrier unit 1120 may cooperate to capture multiple images for different parts of the object 10.

Although the carrier unit 1120 is illustrated as a part of the front end 110, it is appreciated that, in some implementations, the front end 110 of the optical inspection apparatus 110 may not actually include the carrier unit 1120, which on the contrary is part of the manufacturing line. For example, the object 10 may be a semi-finished component placed on the carrier unit 1120 along the manufacturing line, and the sensing unit 1110 is deployed at this part of the manufacturing line in order for inspecting the semi-finished component during manufacturing.

The front end 110 may send the images of the object 10 to a back end 120, which may also be referred to as a processing system or computing system 120. The processing system 120 may be implemented in various ways, for example, the processing system 120 may include one or more processors and/or controllers as well as one or more memories, the processors and/or controllers may execute software to perform various operations or functions, such as operations or functions according to various aspect of the disclosure.

The processing system 120 may receive image data from the sensing unit 1110, and perform various operations by analyzing the image data. In the example of FIG. 1, the processing system 120 may include a classification module 1210, a segmentation module 1220, an anomaly detection module 1230 and a decision module 1240. It is appreciated that the modules 1210-1240 may be implemented in various ways, for example, may be implemented as software modules or functions which are executable by processors and/or controllers. It is appreciated that there may be other modules in addition to the modules 1210-1240 in the computing system 120. For example, a control module in the computing system 120 may be configured to control the operation of the sensing unit 1110 and the carrier unit 1120 in order for capturing one or more images of the object 10, for example, the sensing unit 1110 and the carrier unit 1120 may cooperate under the control of the control module to capture multiple images of different parts of the object. It is appreciated that such a control module may also be implemented in the front end 110. It is appreciated that the computing system 120 may be co-located with the front end 110 in the optical inspection apparatus 100 such as in the housing of the inspection apparatus 100, and may also be located at a remote place from the front end 110, for example, the computing system 120 may be implemented at a server or cloud, and the images captured by the front end 110 may be transferred to the computing system 120 via wired or wireless communication connection.

The classification module 1210 may classify an image of the object 10 as one of a plurality of categories. The segmentation module 1220 may perform defect measurement for the image of the object 10. The anomaly detection module 1230 may perform anomaly detection for the image of the object 10. The decision module 1240 may determine a label for the image of the object 10 as being qualified or unqualified based on the processing result of one or more of the classification module 1210, segmentation module 1220 and the anomaly detection module 1230.

In an example, the classification module 1210 may classify an image of the object 10 as one of a plurality of categories. The decision module 1240 may determine a label for the image of the object 10 as being qualified if the category obtained by the classification module 1210 is a first category. The segmentation module 1220 may perform defect measurement for the image of the object 10 if the category obtained by the classification module 1210 is a second category, wherein the decision module 1240 may determine a label for the image as being qualified or unqualified based on the defect measurement obtained by the segmentation module 1220.

In another example, the anomaly detection module 1230 may perform anomaly detection for the image of the object 10 if the category obtained by the classification module 1210 is a third category, wherein the decision module 1240 may determine a label for the image as being qualified or unqualified based on the anomaly detection obtained by the anomaly detection module.

In another example, the decision module 1240 may determine a label for the image of the object 10 as being unqualified if the category obtained by the classification model 1210 is a fourth category.

The classification module 1210, the segmentation module 1220 and the anomaly detection module 1230 may be implemented with respective trained neural network (NN) models for performing the respective tasks of image classification, semantic segmentation and anomaly detection. The classification module 1210, the segmentation module 1220 and the anomaly detection module 1230 may be interchangeably referred to as classification model, segmentation model and outlier detection model in the disclosure.

Figure 2A:
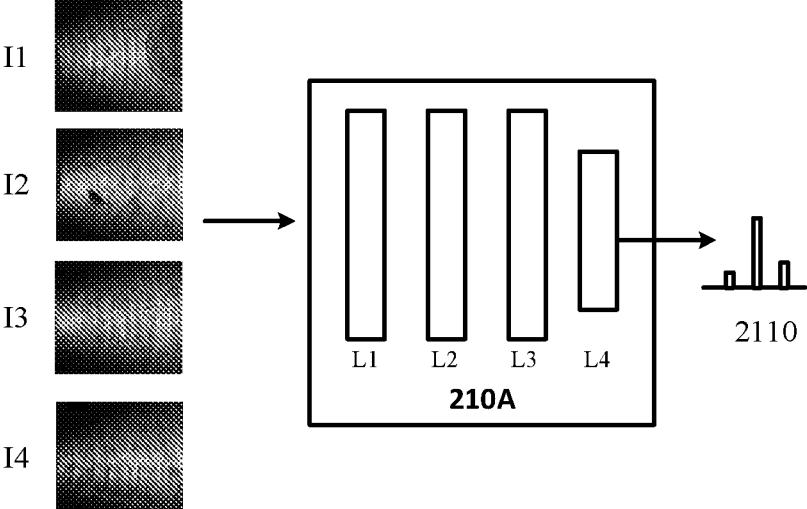
FIG. 2A illustrates an exemplary deep neural network (DNN) model according to an embodiment of the disclosure.

FIG. 2A is a block diagram illustrating an exemplary deep neural network (DNN) model 210A according to an embodiment of the disclosure.

The DNN model 210A for performing an image classification task may be an implementation of the classification module 1210. The DNN model 210A may include a plurality of layers such as an input layer, multiple hidden layers and an output layer. In the example shown in FIG. 2A, the DNN model 210A may include the illustrated layers L1 to L4, with L1 being the input layer, L2 and L3 being the hidden layer and L4 being the output layer. It is appreciated that more or less layers such as hidden layer may be included in the DNN model 210A in different implementations.

The task of image classification of the DNN model 210A is to classify an image as one of a plurality of categories. For example, the DNN model 210A may classify an image by categorizing and labeling groups of pixels or vectors within an image. Deep convolutional neural networks (CNNs) have become the fundamental approach for image classification. In an implementation, the DNN model 210A is implemented as a deep CNN model 210A including multiple convolutional layers as well as other layers such as input layer and output layer. It is appreciated that any suitable CNN model may be employed as the image classification model 210A, and any suitable training method may be employed for training the CNN model. For example, some prevailing networks may be employed as the classification CNN model 210A in the implementations of the disclosure, examples of the prevailing networks includes ResNet (K. He, X. Zhang, S. Ren, and J. Sun, "Deep residual learning for image recognition," in Proceedings of the IEEE conference on computer vision and pattern recognition, pp. 770-778, 2016.), GoogleNet (C. Szegedy, W. Liu, Y. Jia, P. Sermanet, S. Reed, D. Anguelov, D. Erhan, V. Vanhoucke, and A. Rabinovich, "Going deeper with convolutions," in Proceedings of the IEEE conference on computer vision and pattern recognition, pp. 1-9, 2015.), EfficientNet (M. Tan and Q. Le, "Efficientnet: Rethinking model scaling for convolutional neural networks," in International Conference on Machine Learning, pp. 6105-6114, PMLR, 2019.), and so on.

As shown in FIG. 2A, an image of an object may be input to the CNN model 210A. In this example, the object may be a precision-machinery component such as a part of a car fuel injector. Images I1 to I4 are exemplary images of the object and one of images I1 to I4 may be input into the CNN model 210A. In the exemplary images, the image I1 has stain, the image I2 has flake, the image I3 has scratch, the image I4 has some machining marks. The CNN model 210A is trained to perform the task of classifying an image as one of a plurality of categories.

In an example, the CNN model 210A may classify the image as one of two categories, of which a first one is being qualified and a second one is being the other.

In another example, the CNN model 210A may classify the image as one of three categories, of which a first one is being qualified, a second one is defect measurement needed, and a third one is being the other.

In another example, the CNN model 210A may classify the image as one of four categories, of which a first one is being qualified, a second one is defect measurement needed, a third one is being unqualified and a fourth one is being the other.

It is appreciated that there may be other examples for the categories of the CNN model 210A. It is appreciated that the above names of the categories are just exemplary explanation of the categories without limitation to the disclosure.

As shown in FIG. 2A, the CNN model 210A may output a prediction distribution 2110 of the multiple categories for the image and accordingly output a classification label for the image based on the prediction distribution 2110. In the example of classifying the image into three categories and the image I2 is input to the model 210A, for example, the classification label for the image I2 may be the second category which indicates "defect measurement needed".

Figure 2B:
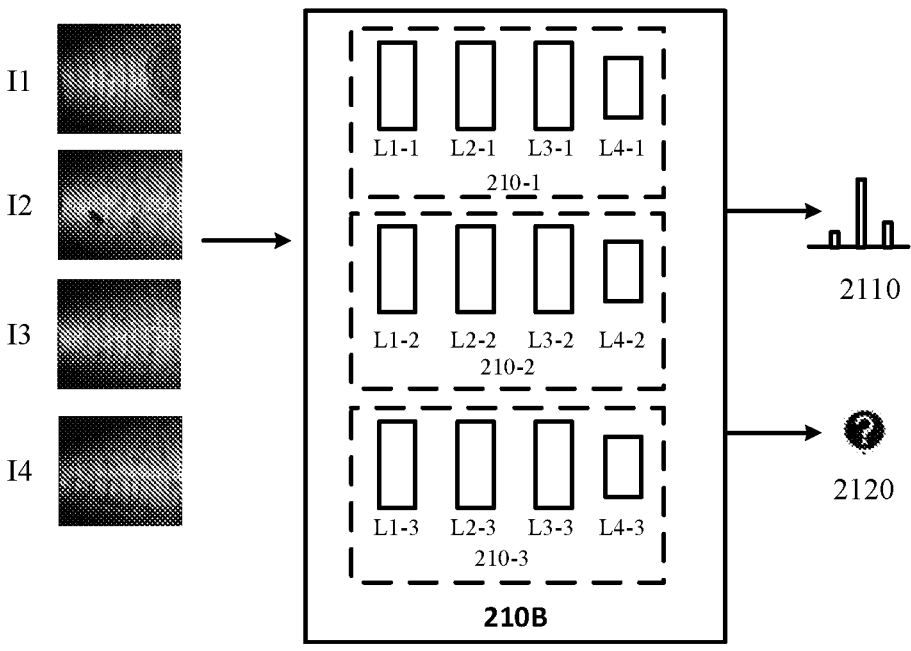
FIG. 2B illustrates an exemplary Bayesian DNN model according to an embodiment of the disclosure.

FIG. 2B is a block diagram illustrating an exemplary Bayesian DNN model 210B according to an embodiment of the disclosure.

The Bayesian DNN model 210B for performing an image classification task may be an implementation of the classification module 1210. In contrast to a DNN model such as the illustrated DNN model 210A in FIG. 2A, the Bayesian DNN model may quantify predictive uncertainty about its output of a task such as the classification task. For example, as illustrated in FIG. 2B, for an input image such as one of I1 to I4, the Bayesian DNN model 210B may output predictive distribution 2110 for the classifications of the image as well as the predictive uncertainty 2120 for the predictive distribution. Generally, for a Bayesian DNN model, a prior distribution is specified upon the parameters of a NN and then, given the training data, the posterior distribution over the parameters is computed, which is used to quantify the predictive uncertainty. Since exact Bayesian inference is computationally intractable for NNs, a variety of approximations have been developed, for example, Laplace approximation (D. J. MacKay, Bayesian methods for adaptive models. PhD thesis, California Institute of Technology, 1992), Markov chain Monte Carlo (MCMC) methods (R. M. Neal, Bayesian learning for neural networks, vol. 118. Springer Science & Business Media, 2012.), as well as recent work on variational Bayesian methods (C. Blundell, J. Cornebise, K. Kavukcuoglu, and D. Wierstra, "Weight uncertainty in neural network," in International Conference on Machine Learning, pp. 1613-1622, PMLR, 2015). It is appreciated that any suitable Bayesian DNN model may be employed for performing the classification task in implementations of the disclosure.

The Bayesian DNN model 210B in FIG. 2B may be a Bayesian CNN model implemented with a simple Deep Ensemble (B. Lakshminarayanan, A. Pritzel, and C. Blundell, "Simple and scalable predictive uncertainty estimation using deep ensembles," arXiv preprint arXiv: 1612.01474, 2016) technique. The Deep Ensemble technique is proposed to estimate predictive uncertainty by using adversarial training and ensemble in training and inference stage respectively, which is relatively easy to implement. As shown in FIG. 2B, the Bayesian CNN model 210B includes multiple CNN sub-models such as CNN sub-models 210-1 to 210-3, each of which is similar to the CNN model 210A and thus may be referred to as a CNN model instance. The multiple CNN sub-models are trained respectively to predict the predictive distribution for the image classification. The output predictive distribution 2110 of the image classification may be an ensemble of the predictive distributions of the multiple CNN sub-models, for example, the output predictive distribution 2110 of the image classification may be an average of the predictive distributions of the multiple CNN sub-models. At the same time, the predictive uncertainty 2120 may be obtained by the Bayesian DNN model 210B. The predictive uncertainty 2120 is a metrics for the confidence of the output predictive distribution 2110, and may be used to decide whether the output predictive distribution 2110 is acceptable. In an embodiment, the Bayesian DNN model 210B may decide a classification for the input image based on the predictive distribution 2110 and the predictive uncertainty 2120.

In an example, the CNN model 210B may classify the image as one of two categories, of which a first one is being qualified and a second one is being the other.

In another example, the CNN model 210B may classify the image as one of three categories, of which a first one is being qualified, a second one is defect measurement needed, and a third one is being the other.

In another example, the CNN model 210B may classify the image as one of four categories, of which a first one is being qualified, a second one is defect measurement needed, a third one is being unqualified and a fourth one is being the other.

It is appreciated that there may be other examples for the categories of the CNN model 210B. It is appreciated that the above names of the categories are just exemplary explanation of the categories without limitation to the disclosure.

Figure 3:
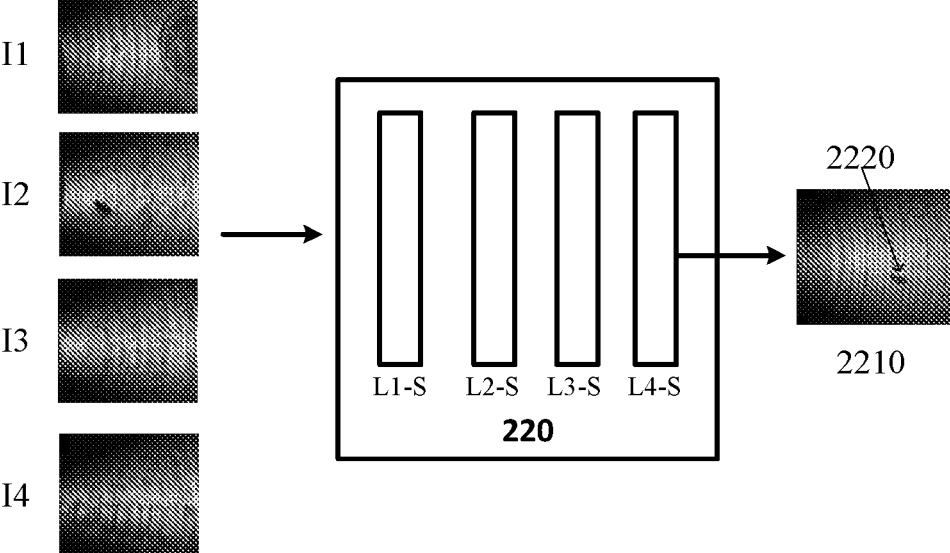
FIG. 3 illustrates an exemplary DNN model according to an embodiment of the disclosure.

FIG. 3 is a block diagram illustrating an exemplary DNN model 220 according to an embodiment of the disclosure.

The DNN model 220 for performing an image segmentation task may be an implementation of the segmentation module 1220. The DNN model 220 may include a plurality of layers such as an input layer, multiple hidden layers and an output layer. In the example shown in FIG. 3, the DNN model 220 may include the illustrated layers L1-S to L4-S, with L1-S being the input layer, L2-S and L3-S being the hidden layer and L4-S being the output layer. It is appreciated that more or less layers such as hidden layer may be included in the DNN model 220 in different implementations.

The task of the image segmentation of the DNN model 220 is to detect the defect region of the object shown on the image of the object. Taking the image I2 as an example shown in FIG. 3, the segmentation model 220 may identify the defect region 2220 which is a part of the output 2210.

Image segmentation is the process of classifying each pixel in an image belonging to a certain class and hence can be thought of as a classification problem per pixel. The DNN model 220 may be implemented as a CNN model 220. In an implementation, fully convolutional networks (FCNs) (J. Long. E. Shelhamer, and T. Darrell, "Fully convolutional networks for semantic segmentation," in Proceedings of the IEEE conference on computer vision and pattern recognition, pp. 3431-3440, 2015) may be employed for semantic segmentation. A FCN uses a convolutional neural network to transform image pixels to pixel categories. Unlike the traditional CNNs, an FCN transforms the height and width of the intermediate layer feature map back to the size of input image through the transposed convolution layer, so that the output predictions have a one-to-one correspondence with input image in spatial dimension (height and width). It is appreciated that any suitable CNN model or FCN model may be employed as the image segmentation model 220, and any suitable training method may be employed for training the model 220. For example, some prevailing networks may be employed as the segmentation model 220 in the implementations of the disclosure, some prevailing segmentation models include Unet (O. Ronneberger, P. Fischer, and T. Brox, "U-net: Convolutional networks for biomedical image segmentation," in International Conference on Medical image computing and computer assisted intervention, pp. 234-241, Springer, 2015.), Deeplab (L. C. Chen, G. Papandreou, I. Kokkinos, K. Murphy, and A. L. Yuille, "Deeplab: Semantic image segmentation with deep convolutional nets, atrous convolution, and fully connected crfs," IEEE transactions on pattern analysis and machine intelligence, vol. 40, no. 4, pp. 834-848. 2017.), HRNet (J. Wang, K. Sun, T. Cheng, B. Jiang, C. Deng, Y. Zhao, D. Liu, Y. Mu, M. Tan, X. Wang, et al., "Deep high-resolution representation learning for visual recognition," IEEE transactions on pattern analysis and machine intelligence, 2020.) and so on.

Figure 4A:
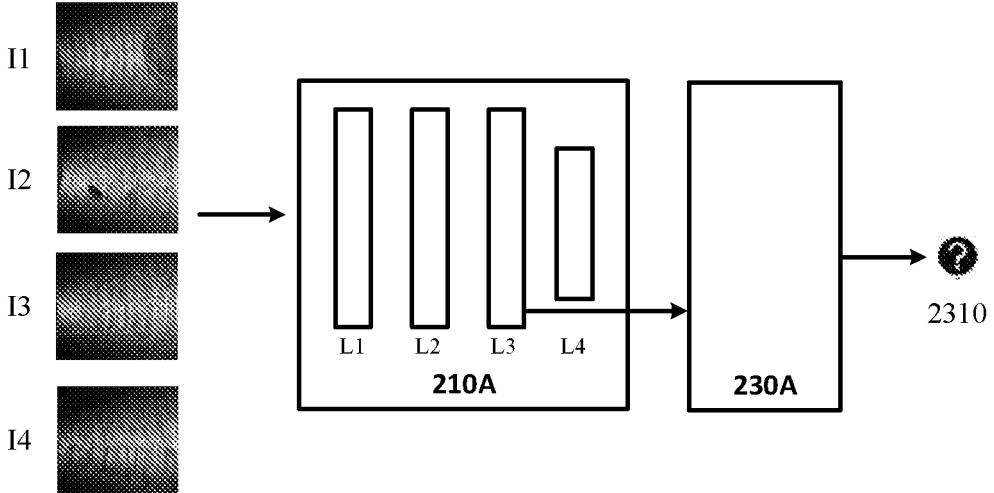
FIG. 4A illustrates an exemplary neural network (NN) model according to an embodiment of the disclosure.

FIG. 4A is a block diagram illustrating an exemplary neural network (NN) model 230A according to an embodiment of the disclosure.

The NN 230A for performing anomaly detection for an input data such as the input image of the classification model 210A may be an implementation of the anomaly detection module 1230.

The task of anomaly detection of the NN model 230A is to determine whether an input data of the model 230A is a normal data belonging to the normal data manifest or an abnormal data not belonging to the normal data region. Generally, anomaly detection or outlier detection is to find patterns in data that do not conform to expected behavior. These non-conforming patterns are often referred to as anomalies, outliers or discordant observations in different application domains. Conventionally, a straightforward anomaly detection approach is to define a region representing normal behavior and declare any observation in the data that does not belong to this normal region as an anomaly.

In the example illustrated in FIG. 4A, a score 2310 indicating the distance of the input data from the normal data region may be obtained by the model 230A, and a decision whether the input data is normal or not may be decided based on the score. In order to establish the normal data manifest for the model 230A, the model 230A may be trained with so called normal data. In an implementation of the disclosure, the model 230A may be trained with images of objects that are determined as being qualified. Anomaly detection models can be divided into supervised learning, semi-supervised learning, unsupervised learning. In practice, the anomaly detection model based on unsupervised learning is more commonly used. Unsupervised deep anomaly detection techniques detect outliers solely based on intrinsic properties of the data instances.

It is appreciated that any suitable NN model may be employed as the anomaly detection model 230A, and any suitable training method may be employed for training the NN model 230A. For example, some prevailing networks may be employed as the anomaly detection model 230A in the implementations of the disclosure, examples of the prevailing networks includes one-class SVM (B. Scholkopf, R. C. Williamson, A. J. Smola, J. Shawe-Taylor, J. C. Platt, et al., "Support vector method for novelty detection.," in NIPS, vol. 12, pp. 582-588, Citescer, 1999.), Isolation Forest (F. T. Liu, K. M. Ting, and Z. H. Zhou, "Isolation forest," in 2008 eighth ieee international conference on data mining, pp. 413-422, IEEE, 2008.), autoencoders (P. Vincent, H. Larochelle, Y. Bengio, and P. A. Manzagol, "Extracting and composing robust features with denoising autoencoders," in Proceedings of the 25th international conference on Machine learning, pp. 1096-1103, 2008.), Kmeans (T. Kanungo, D. M. Mount, N. S. Netanyahu, C. D. Piatko, R. Silverman, and A. Y. Wu, "An efficient k-means clustering algorithm: Analysis and implementation," IEEE transactions on pattern analysis and machine intelligence, vol. 24, no. 7, pp. 881-892, 2002.) and so on.

As shown in FIG. 4A, the input of the anomaly detection model 230A may be the feature map obtained by a hidden layer such as the layer L3 immediately before the output layer L4, the anomaly detection model 230A may output a severity score 2310 for the input image of the classification model 210A based on the feature map.

Figure 4B:
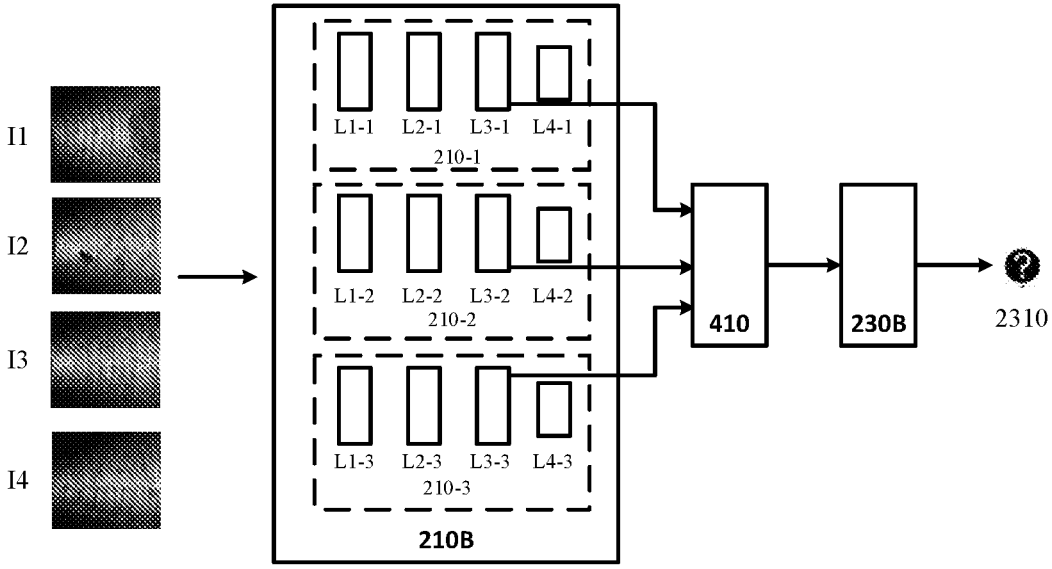
FIG. 4B illustrates an exemplary neural network (NN) model according to an embodiment of the disclosure.

FIG. 4B is a block diagram illustrating an exemplary neural network (NN) model 230B according to an embodiment of the disclosure.

The NN 230B for performing anomaly detection for an input data may same as the anomaly detection model 230A as illustrated in FIG. 4A. The difference between FIG. 4B and FIG. 4A is that the input feature map of the anomaly detection model 230B comes from the Bayesian CNN model 210B.

In the example illustrated in FIG. 4B, the feature maps output by the last hidden layers L3-1 to L3-3 of the multiple sub-models 210-1 to 210-3 of the Bayesian CNN model 210B are provided to a combination unit 410. The combination unit 410 may combine the feature maps to obtain a combined feature map for the input image of the Bayesian CNN model 210B. For example, the combination unit 410 may average the feature maps of the multiple CNN sub-models, and the anomaly detection model 230B may obtain the anomaly score for the image based on the averaged feature map of the image. In another example, the combination unit 410 may average the feature maps of a part of the multiple CNN sub-models. In another example, the combination unit 410 may select the feature map of one of the multiple CNN sub-models. The combination unit 410 may select the feature map of a fixed one of the multiple CNN sub-models. The combination unit 410 may select the feature map of a random one of the multiple CNN sub-models.

It is appreciated that the combination unit 410 is not necessary when the feature map of a fixed CNN sub-model is input to the anomaly detection model 230B. It is appreciated that the combination unit 410 may be implemented as a part of the Bayesian CNN model 210B or as a part of the anomaly detection model 230B.

Figure 5A:
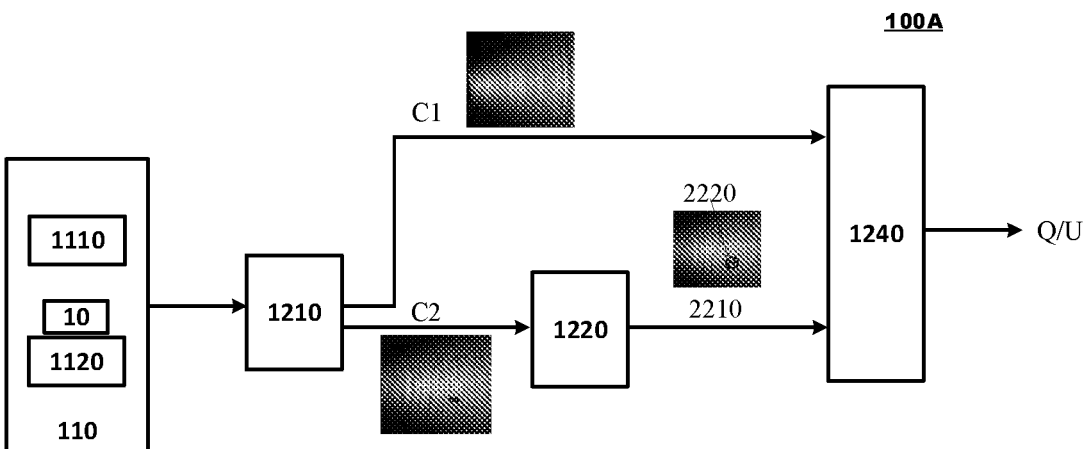
FIG. 5A illustrates an exemplary apparatus for automatic optical inspection of an object according to an embodiment of the disclosure.

FIG. 5A is a block diagram illustrating an exemplary apparatus for automatic optical inspection of an object according to an embodiment of the disclosure.

The optical inspection apparatus 100A may be an exemplary implementation of the optical inspection apparatus 100 for inspecting finished or semi-finished products illustrated in FIG. 1, same reference labels denote same or corresponding elements in the Figures.

The imaging unit 1110 may obtain one or more images of an object 10 positioned on the object carrier unit 1120. The front end 110 may send the one or more images of the object 10 to the processing system 120, in which the classification module 1210 may process each of the one ore more images of the object 10. Examples of the images of the object 10 may be the images I1 to I4 as well as other images.

In the example illustrated in FIG. 5A, the classification module 1210 may classify an input image as one of two categories C1 and C2, where a first category C1 indicates being qualified and a second category C2 indicates being the other. For example, the image shown on the C1 branch is an example that is classified as being qualified, this means the imaged part of the object is decided as being qualified by the classification module 1210. It is appreciated that the image shown on the C1 branch is just shown in the FIG. 5A for illustration, but it is not actually sent to the decision model 1240. The decision module 1240 may make a decision that this image of the object 10 is being qualified, which is denoted as Q in the FIG. 5A, based on the classified category C1 of the classification module 1210.

In an example, the classification module 1210 may be implemented as a CNN module such as CNN module 210A illustrated in FIG. 2A, and the classification module 1210 classify the input image as one of category C1, which indicates being qualified, and category C2, which indicates being the other. In another example, the classification module 1210 may be implemented as a Bayesian CNN model such as CNN model 210B illustrated in FIG. 2B, and the classification module 1210 classify the input image as one of category C1, which indicates being qualified, that is, being qualified with low uncertainty, and category C2, which indicates being the other. In this example, for an image, if the classification prediction 2110 indicates being qualified and the prediction uncertainty 2120 indicates a low uncertainty such as lower than a threshold, the Bayesian CNN model 210B may classify the image as category C1 which indicates being qualified; if the classification prediction 2110 indicates being qualified and the prediction uncertainty 2120 indicates a high uncertainty such as higher than a threshold, the Bayesian CNN model 210B may classify the image as category C2 which indicates being the other. The classification prediction 2110 may classify the image as category C2 for all situations other than the C1 category.

When the image is classified by the classification module 1210 as the second category C2, the defect measurement module 1220 may perform defect measurement for the image as illustrated in the C2 branch. The defect measurement module 1220 may be implemented as an image segmentation model such as the segmentation mode 220 shown in FIG. 3. Taking the image I2 shown in FIG. 3 as an example, the image I2, which is classified as the second category C2, is input into the segmentation module 1220 and the defect region 2220 is identified in the output 2210 of the segmentation module 1220. As shown in the FIG. 5A, the region and position of the defect 2220 may be identified by the segmentation module 1220. Then the decision module 1240 may decide whether the image I2 is being qualified or unqualified based on the defect measurement of the segmentation module 1220.

In an example, the decision module 1240 may determine defect region and position of the defect on the image based on the output of the segmentation module 1220. Although only one defect 2220 is illustrated in FIG. 5A, it is appreciated that there may be one or more defects in the image output by the segmentation module 1220. The decision module 1240 may determine the size of each of the more or more defects based on the defect region, and may determine the label for the image as being qualified or unqualified based on at least one of the size of each of the one or more defects, the position of each of the one or more defects and the number of the one or more defects. The size of each of the one or more defects being one of diameter of a circumcircle of the region of the defect, area of the circumcircle of the defect region of the defect, and area of the defect region of the defect.

The circumcircle of the defect is illustrated as the dotted circle encircling the defect region 2220, where the diameter of the circumcircle is the longest distance between two dots in the defect region. Therefore the diameter of the circumcircle and the area of the circumcircle may represent the size of the defect region.

In an example, the decision module 1240 may decide that the image of the object 10 is qualified if the size of each of the one or more defects is smaller than a threshold and the image of the object 10 is unqualified otherwise.

In another example, the decision module 1240 may decide that the image of the object 10 is qualified if the number of the defects is smaller than a threshold and the image of the object 10 is unqualified otherwise.

In another example, the decision module 1240 may decide that the image of the object 10 is qualified if the one or more defects is located outside a specific region of the object such as a critical region of the object and the image of the object 10 is unqualified otherwise.

In another example, the decision module 1240 may decide whether the image of the object is qualified or unqualified based on any combination of the size, the number and the location of the one or more defects.

It is known that the decision module 1240 may determine a label for each of the one or more images of the object 10 as being qualified or unqualified, and the object 10 may be detected as being unqualified as long as one of its images is decided as unqualified. In other words, the object 10 may be detected as being qualified only if all the one or more images of the object are decided as qualified by the decision module 1240.

Figure 5B:
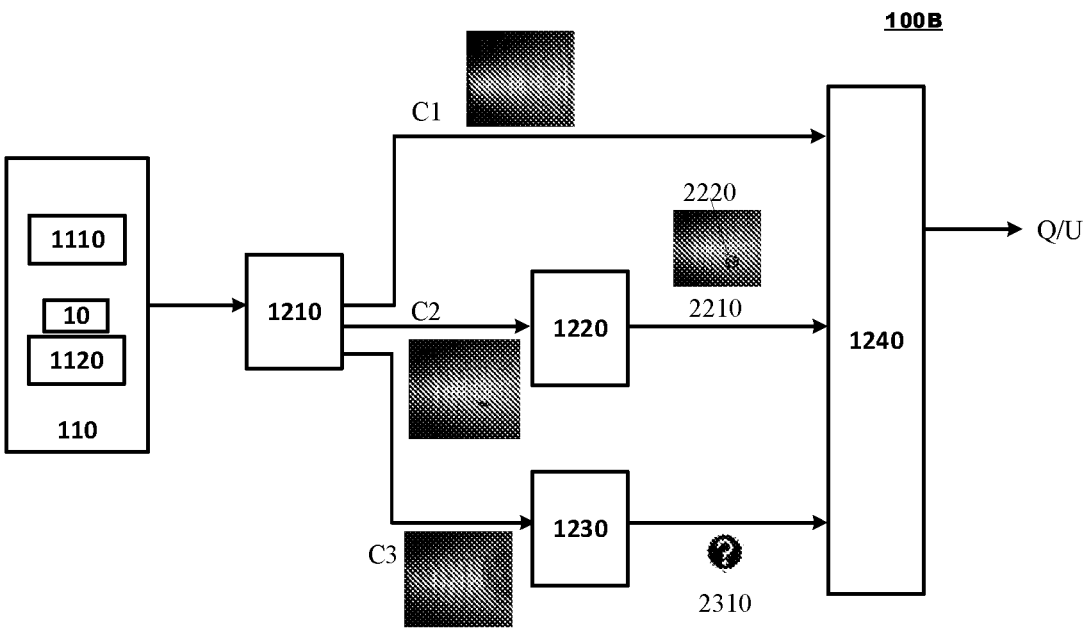
FIG. 5B illustrates an exemplary apparatus for automatic optical inspection of an object according to an embodiment of the disclosure.

FIG. 5B is a block diagram illustrating an exemplary apparatus for automatic optical inspection of an object according to an embodiment of the disclosure.

The optical inspection apparatus 100B may be an exemplary implementation of the optical inspection apparatus 100 for inspecting finished or semi-finished products illustrated in FIG. 1, same reference labels denote same or corresponding elements in the Figures.

The imaging unit 1110 may obtain one or more images of an object 10 positioned on the object carrier unit 1120. The front end 110 may send the one or more images of the object 10 to the processing system 120, in which the classification module 1210 may process each of the one or more images of the object 10. Examples of the images of the object 10 may be the images I1 to I4 as well as other images.

In the example illustrated in FIG. 5B, the classification module 1210 may classify an input image as one of three categories C1, C2 and C3, where a first category C1 indicates being qualified, a second category C2 indicates being defect measurement needed, and a third category C3 indicates being the other. For example, the image shown on the C1 branch is an example that is classified as being qualified, this means the imaged part of the object is decided as being qualified by the classification module 1210. The decision module 1240 may make a decision that this image of the object 10 is being qualified, which is denoted as Q in the FIG. 5B, based on the classified category C1 of the classification module 1210.

In an example, the classification module 1210 may be implemented as a CNN module such as CNN module 210A illustrated in FIG. 2A, and the classification module 1210 classify the input image as one of category C1, which indicates being qualified, category C2, which indicates being defect measurement needed, and category C3, which indicates being the other. In another example, the classification module 1210 may be implemented as a Bayesian CNN model such as CNN model 210B illustrated in FIG. 2B, and the classification module 1210 classify the input image as one of category C1, which indicates being qualified, that is, being qualified with low uncertainty, category C2, which indicates being defect measurement needed, that is, being defect measurement needed with low uncertainty, and category C3, which indicates being the other. In this example, for an image, if the classification prediction 2110 indicates being qualified and the prediction uncertainty 2120 indicates a low uncertainty such as lower than a threshold, the Bayesian CNN model 210B may classify the image as category C1 which indicates being qualified; if the classification prediction 2110 indicates being defect measurement needed and the prediction uncertainty 2120 indicates a low uncertainty such as lower than a threshold, the Bayesian CNN model 210B may classify the image as a category C2 which indicates being defect measurement needed; and the classification prediction 2110 may classify the image as category C3 for all situations other than the C1 and C2 categories.

In another example, the second category C2 of the Bayesian CNN model 1220 may be defect measurement needed low uncertainty or high uncertainty, that is to say, the image may be classified by the Bayesian CNN model 1220 as the second category C2 based on the classification prediction 2110 indicating defect measurement needed in despite of the corresponding prediction uncertainty 2120. In this example, for an image, if the classification prediction 2110 indicates being qualified and the prediction uncertainty 2120 indicates a low uncertainty such as lower than a threshold, the Bayesian CNN model 210B may classify the image as category C1 which indicates being qualified; if the classification prediction 2110 indicates being defect measurement needed, the Bayesian CNN model 210B may classify the image as a category C2 which indicates being defect measurement needed no matter what the prediction uncertainty 2120 is; and the classification prediction 2110 may classify the image as category C3 for all situations other than the C1 and C2 categories.

When the image is classified by the classification module 1210 as the second category C2 which indicates defect measurement needed, the defect measurement module 1220 may perform defect measurement for the image as illustrated in the C2 branch. The process for the defection measurement of module 1220 and the corresponding operation of module 1240 is same as that detailed with reference to FIG. 5A, and thus is not repetitively described here.

When the image is classified by the classification module 1210 as the third category C3 which indicates being the other, the anomaly detection module 1230 may perform anomaly detection for the image as illustrated in the C3 branch. The anomaly detection module 1230 may be implemented as an outlier detection model such as the outlier detection model 230A or 230B shown in FIG. 4A or 4B. Taking the image I1 shown in FIG. 4A or 4B as an example, the feature map of the image I1, which is classified as the third category C3, is input into the anomaly detection module 1230, which output a severity score 2310 for the image based on the feature map of the image. The severity score 2310 may also be referred to as an anomaly score, which indicates a deviation of the image from a manifold of images labeled as qualified. Then the decision module 1240 may decide whether the image I1 is being qualified or unqualified based on the severity score 2310. In an example, the decision module 1240 may decide that the image of the object 10 is qualified if severity score of the image is smaller than a threshold and the image of the object 10 is unqualified otherwise. By using the anomaly detection module 1230 in the optical inspection framework, some falsely classified images may be recalled by the anomaly detection module 1230 so as to reduce the overall false alarm rate. For example, in the embodiment shown in FIG. 5B, the first and second categories C1 and C2 are strictly classified according to their prediction probabilities and uncertainties in order to keep the escape rate low, some actually qualified image samples may be mixed into the third category C3 in this situation resulting in false alarm. In this situation, some of the actually qualified image samples mixed into the third category C3 may be recalled by the anomaly detection module 1230, so as to reduce the overall false alarm rate.

In an embodiment, when the classification module 1210 is implemented as a Bayesian NN model such as a Bayesian CNN model including a plurality of CNN models, the feature map as the input of the anomaly detection module 1230 may be a feature map obtained by a fixed one of the plurality of CNN models, a feature map obtained by a randomly selected one of the plurality of CNN models, or a feature map averaged over feature maps of at least a part of the plurality of CNN models. The performance of the anomaly detection module 1230 may be further improved by using the feature map of the randomly selected one of the plurality of CNN models or the averaged feature map of the at least a part of the plurality of CNN models.

Figure 5C:
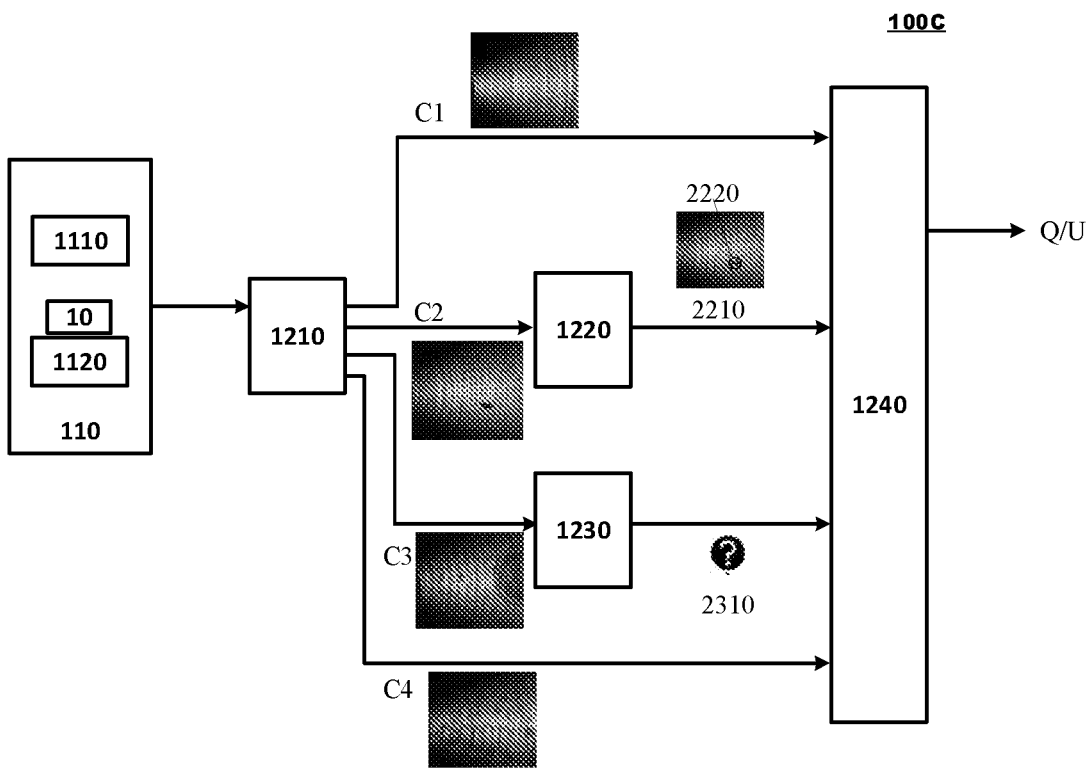
FIG. 5C illustrates an exemplary apparatus for automatic optical inspection of an object according to an embodiment of the disclosure.

FIG. 5C is a block diagram illustrating an exemplary apparatus for automatic optical inspection of an object according to an embodiment of the disclosure.

The optical inspection apparatus 100C may be an exemplary implementation of the optical inspection apparatus 100 for inspecting finished or semi-finished products illustrated in FIG. 1, same reference labels denote same or corresponding elements in the Figures.

The imaging unit 1110 may obtain one or more images of an object 10 positioned on the object carrier unit 1120. The front end 110 may send the one or more images of the object 10 to the processing system 120, in which the classification module 1210 may process each of the one or more images of the object 10. Examples of the images of the object 10 may be the images I1 to I4 as well as other images.

In the example illustrated in FIG. 5C, the classification module 1210 may classify an input image as one of four categories C1, C2, C3 and C4, where a first category C1 indicates being qualified, a second category C2 indicates being defect measurement needed, a fourth category C4 indicates being unqualified and a third category C3 indicates being the other. For example, the image shown on the C1 branch is an example that is classified as being qualified, this means the imaged part of the object is decided as being qualified by the classification module 1210. The decision module 1240 may make a decision that this image of the object 10 is being qualified, which is denoted as Q in the FIG. 5C, based on the classified category C1 of the classification module 1210. For example, the image shown on the C4 branch is an example that is classified as being unqualified, this means the imaged part of the object is decided as being unqualified by the classification module 1210. The decision module 1240 may make a decision that this image of the object 10 is being unqualified, which is denoted as U in the FIG. 5C, based on the classified category C4 of the classification module 1210.

In an example, the classification module 1210 may be implemented as a CNN module such as CNN module 210A illustrated in FIG. 2A, and the classification module 1210 may classify the input image as one of category C1, which indicates being qualified, category C2, which indicates being defect measurement needed, category C4, which indicates being unqualified, and category C3, which indicates being the other. In another example, the classification module 1210 may be implemented as a Bayesian CNN model such as CNN model 210B illustrated in FIG. 2B, and the classification module 1210 may classify the input image as one of category C1, which indicates being qualified, that is, being qualified with low uncertainty, category C2, which indicates being defect measurement needed, that is, being defect measurement needed with low uncertainty, category C4, which indicates being unqualified, that is, being unqualified with low uncertainty, and category C3, which indicates being the other. In this example, for an image, if the classification prediction 2110 indicates being qualified and the prediction uncertainty 2120 indicates a low uncertainty such as lower than a threshold, the Bayesian CNN model 210B may classify the image as category C1 which indicates being qualified; if the classification prediction 2110 indicates being defect measurement needed and the prediction uncertainty 2120 indicates a low uncertainty such as lower than a threshold, the Bayesian CNN model 210B may classify the image as a category C2 which indicates being defect measurement needed; if the classification prediction 2110 indicates being unqualified and the prediction uncertainty 2120 indicates a low uncertainty such as lower than a threshold, the Bayesian CNN model 210B may classify the image as category C4 which indicates being qualified; and the classification prediction 2110 may classify the image as category C3 for all situations other than the C1, C2 and C4 categories.

In another example, the second category C2 of the Bayesian CNN model 1220 may be defect measurement needed low uncertainty or high uncertainty, that is to say, the image may be classified by the Bayesian CNN model 1220 as the second category C2 based on the classification prediction 2110 indicating defect measurement needed in despite of the corresponding prediction uncertainty 2120. In this example, for an image, if the classification prediction 2110 indicates being qualified and the prediction uncertainty 2120 indicates a low uncertainty such as lower than a threshold, the Bayesian CNN model 210B may classify the image as category C1 which indicates being qualified; if the classification prediction 2110 indicates being defect measurement needed, the Bayesian CNN model 210B may classify the image as a category C2 which indicates being defect measurement needed no matter what the prediction uncertainty 2120 is; if the classification prediction 2110 indicates being unqualified and the prediction uncertainty 2120 indicates a low uncertainty such as lower than a threshold, the Bayesian CNN model 210B may classify the image as category C4 which indicates being qualified; and the classification prediction 2110 may classify the image as category C3 for all situations other than the C1 and C2 categories.

When the image is classified by the classification module 1210 as the second category C2 which indicates defect measurement needed, the defect measurement module 1220 may perform defect measurement for the image as illustrated in the C2 branch. The process for the defection measurement of module 1220 and the corresponding operation of module 1240 is same as that detailed with reference to FIG. 5A, and thus is not repetitively described here.

When the image is classified by the classification module 1210 as the third category C3 which indicates being the other, the anomaly detection module 1230 may perform anomaly detection for the image as illustrated in the C3 branch. The process for the anomaly detection of module 1230 and the corresponding operation of module 1240 is same as that detailed with reference to FIG. 5B, and thus is not repetitively described here.

In the embodiments illustrated in FIGS. 5A to 5C, by using the defect measurement module 1220 and/or the anomaly detection module 1230 in combination with the image classification module 1210, the false alarm rate of the qualification inspection of the product or object 10 may be decreased while keeping the low escape rate.

Figure 6A:
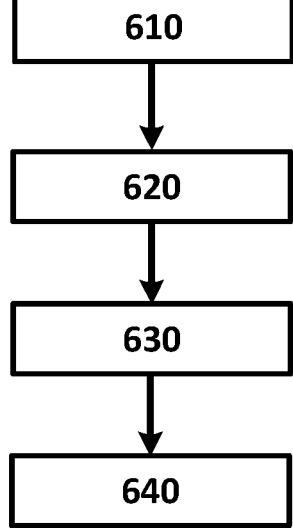
FIG. 6A illustrates an exemplary process for performing automatic optical inspection of an object according to an embodiment of the disclosure.

FIG. 6A illustrates an exemplary process for performing automatic optical inspection of an object according to an embodiment of the disclosure.

At 610, an image of the object is received. As illustrated in FIG. 1, an image of the object 10 may be received by the processing system 120 from the front end 110. By way of example without limitation, the object may be one of a precision-machinery component, weld assembly, coated part, an intermediate product, and a semi-finished product during manufacturing.

It is appreciated that one or more images of the object may be captured by the vision unit 1110 and may be received by the processing system 120 at step 610. The object may be decided by the processing system 120 as an unqualified product as long as any one of the one or more images of the object is decided as being unqualified by the processing system 120.

At 620, the image of the object may be classified as one of a plurality of categories by a classification model.

At 630, a label for the image of the object may be determined as being qualified if the category obtained by the classification model is a first category.

At 640, defect measurement for the image may be performed by a segmentation model and a label for the image may be determined as being qualified or unqualified based on the defect measurement obtained by the segmentation model if the category obtained by the classification model is a second category.

In an embodiment, the first category may be being qualified, the second category may be being the other. In this embodiment, the segmentation model may be a DNN a CNN model, or may be a Bayesian DNN or CNN model. It is appreciated that the name "being qualified" or "being the other" of the category is just for sake of easy understanding, other names may be used in the embodiments of the disclosure.

In an embodiment, the first category may be being qualified with low uncertainty, the second category may be being the other. In this embodiment, the segmentation model may be a Bayesian DNN or CNN model.

Figure 6B:
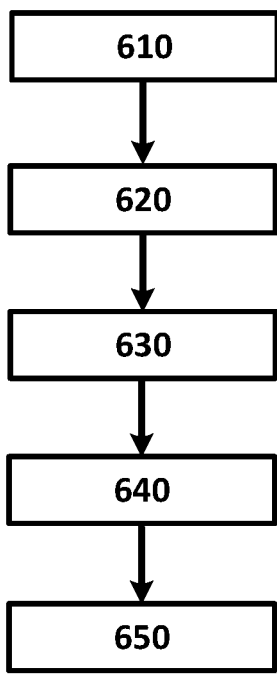
FIG. 6B illustrates an exemplary process for performing automatic optical inspection of an object according to an embodiment of the disclosure.

FIG. 6B illustrates an exemplary process for performing automatic optical inspection of an object according to an embodiment of the disclosure.

The steps 610-640 of FIG. 6B are similar to those of FIG. 6A and thus are not described repetitively. At step 650, anomaly detection for the image may be further performed by an outlier detection model and a label for the image may be determined as being qualified or unqualified based on the anomaly detection obtained by the outlier detection model if the category obtained by the classification model is a third category.

In an embodiment, the first category may be being qualified, the second category may be being defect measurement needed, and the third category may be being the other. In this embodiment, the segmentation model may be a DNN a CNN model, or may be a Bayesian DNN or CNN model.

In an embodiment, the first category may be being qualified with low uncertainty, the second category may be being defect measurement needed with low uncertainty, and the third category may be being the other. In this embodiment, the segmentation model may be a Bayesian DNN or CNN model.

In an embodiment, the first category may be being qualified with low uncertainty, the second category may be being defect measurement needed with low uncertainty or high uncertainty, and the third category may be being the other. In this embodiment, the segmentation model may be a Bayesian DNN or CNN model.

Figure 6C:
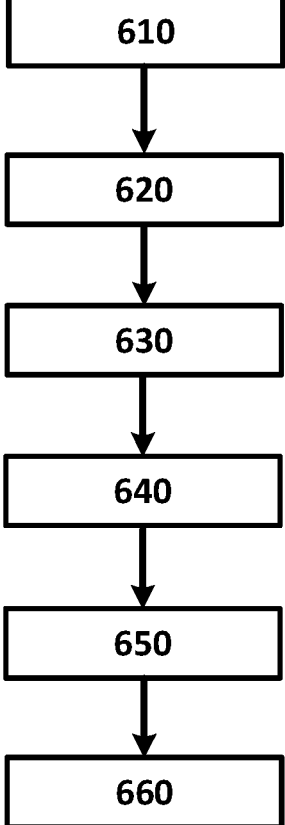
FIG. 6C illustrates an exemplary process for performing automatic optical inspection of an object according to an embodiment of the disclosure.

FIG. 6C illustrates an exemplary process for performing automatic optical inspection of an object according to an embodiment of the disclosure.

The steps 610-650 of FIG. 6C are similar to those of FIG. 6B and thus are not described repetitively. At step 660, a label for the image may be determined as being unqualified if the category obtained by the classification model is a fourth category.

In an embodiment, the first category may be being qualified, the second category may be being defect measurement needed, the fourth category may be being unqualified, and the third category may be being the other. In this embodiment, the segmentation model may be a DNN a CNN model, or may be a Bayesian DNN or CNN model.

In an embodiment, the first category may be being qualified with low uncertainty, the second category may be being defect measurement needed with low uncertainty, the fourth category may be being unqualified with low uncertainty, and the third category may be being the other. In this embodiment, the segmentation model may be a Bayesian DNN or CNN model.

In an embodiment, the first category may be being qualified with low uncertainty, the second category may be being defect measurement needed with low uncertainty or high uncertainty, the fourth category may be being unqualified with low uncertainty, and the third category may be being the other. In this embodiment, the segmentation model may be a Bayesian DNN or CNN model.

It is appreciated that although not depicted in a Figure, an embodiment of process for performing automatic optical inspection of an object may include operations 610-640 and 660 without operation 650.

Figure 7:
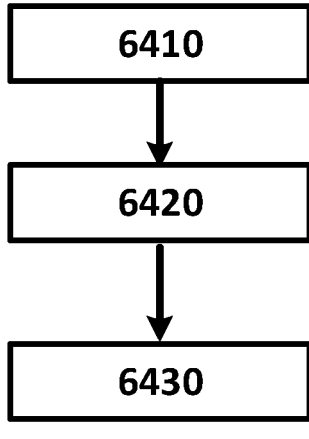
FIG. 7 illustrates an exemplary process for the operation at 640 of FIG. 6A according to an embodiment of the disclosure.

FIG. 7 illustrates an exemplary process for the operation at 640 of FIG. 6A according to an embodiment of the disclosure.

At 6410, defect region of each of one or more defects on the image may be identified. The segmentation model may be a fully convolutional network (FCN) model employed to identify the region of the one or more defects on the image of the object.

At 6420, size of each of the more or more defects may be determined based on the defect region.

At 6430, the label for the image may be determined as being qualified or unqualified based on at least one of the size of each of the one or more defects, the position of each of the one or more defects and the number of the one or more defects.

In an embodiment, the size of each of the one or more defects may be one of diameter of a circumcircle of the region of the defect, area of the circumcircle of the defect region of the defect, and area of the defect region of the defect.

Figure 8:
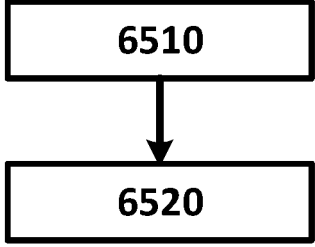
FIG. 8 illustrates an exemplary process for the operation at 650 of FIG. 6B according to an embodiment of the disclosure.

FIG. 8 illustrates an exemplary process for the operation at 650 of FIG. 6B according to an embodiment of the disclosure.

At 6510, an anomaly score for the image may be obtained by the outlier detection model based on feature map of the image obtained by the classification model. The anomaly score indicates a deviation of the image from a manifold of images labeled as being qualified.

At 6520, the label for the image may be determined as being qualified or unqualified based on the anomaly score.

In an embodiment, the classification model may be a Bayesian CNN model including a plurality of CNN models. It is appreciated that the plurality of CNN models may also be referred to as CNN model instances in the Bayesian CNN model. The feature map of the image may be one of a feature map obtained by a fixed one of the plurality of CNN models, a feature map obtained by a randomly selected one of the plurality of CNN models, a feature map averaged over feature maps of at least a part of the plurality of CNN models.

Figure 9:
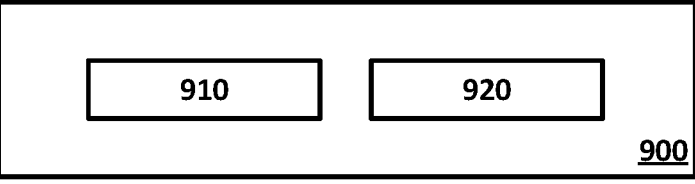
FIG. 9 illustrates an exemplary computing system according to an embodiment of the disclosure.

FIG. 9 illustrates an exemplary computing system according to an embodiment of the disclosure. The computing system 900 may comprise at least one processor 910. The computing system 900 may further comprise at least one storage device 920. The storage device 920 may store computer-executable instructions that, when executed, cause the processor 910 to perform any operations according to the embodiments of the present disclosure as described in connection with FIGS. 1-8.

The embodiments of the present disclosure may be embodied in a computer-readable medium such as non-transitory computer-readable medium. The non-transitory computer-readable medium may comprise instructions that, when executed, cause one or more processors to perform any operations according to the embodiments of the present disclosure as described in connection with FIGS. 1-8.

The embodiments of the present disclosure may be embodied in a computer program product comprising computer-executable instructions that, when executed, cause one or more processors to perform any operations according to the embodiments of the present disclosure as described in connection with FIGS. 1-8.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:
1. A method for automatic optical inspection, comprising:
receiving an image of an object;
classifying the image of the object as one of a plurality of categories using a classification model;
in response to the image of the object being classified as a first category of the plurality of categories, labeling the image of the object as being qualified;
in response to the image of the object being classified as a second category of the plurality of categories, (i) determining a defect measurement by segmenting the image of the object using a segmentation model and (ii) labeling the image as being qualified or unqualified based on the defect measurement; and
in response to the image of the object being classified as a third category of the plurality of categories, (i) determining an anomaly score for the image of the object using an anomaly detection model and (ii) labeling the image as being qualified or unqualified based on the anomaly score.
2. The method of claim 1, further comprising:
in response to the image of the object being classified as a fourth category of the plurality of categories, labeling the image as being unqualified.
3. The method of claim 2, wherein one of:
the first category indicates that the object is qualified, the second category indicates that defect measurement needed, the fourth category being unqualified, and the third category indicates another situation;
the first category indicates that the object is qualified with uncertainty that is less than a first threshold uncertainty, the second category indicates that defect measurement needed with uncertainty that is less than a second threshold uncertainty, the fourth category being unqualified with low uncertainty, and the third category indicates another situation; or
the first category indicates that the object is qualified with uncertainty that is less than the first threshold uncertainty, the second category indicates that defect measurement needed with uncertainty that is less than the second threshold uncertainty or is greater than a third threshold uncertainty, the fourth category indicates that the object is unqualified with uncertainty that is less than a fourth threshold uncertainty, and the third category indicates another situation.
4. The method of claim 1, wherein one of:
the first category indicates that the object is qualified and the second category indicates another situation; or
the first category indicates that the object is qualified with uncertainty that is less than a first threshold uncertainty and the second category indicates another situation.
5. The method of claim 1, wherein one of:
the first category indicates that the object is qualified, the second category indicates that defect measurement is needed, and the third category indicates another situation;
the first category indicates that the object is qualified with uncertainty that is less than a first threshold uncertainty, the second category indicates that defect measurement needed with uncertainty that is less than a second threshold uncertainty, and the third category indicates another situation; or the first category indicates that the object is qualified with uncertainty that is less than the first threshold uncertainty, the second category indicates that defect measurement needed with uncertainty that is less than the second threshold uncertainty or is greater than a third threshold uncertainty, and the third category indicates another situation.

6. The method of claim 1, the determining the defect measurement further comprising:

identifying a defect region of each of one or more defects on the image;

determining a size of each of the one or more defects based on the defect region; and labeling the image as being qualified or unqualified based on at least one of the size of each of the one or more defects, a position of each of the one or more defects and a number of the one or more defects.

7. The method of claim 6, wherein the size of each of the one or more defects being one of diameter of a circumcircle of the defect region each of the one or more defects, an area of the circumcircle of the defect region each of the one or more defects, and an area of the defect region each of the one or more defects.

8. The method of claim 1, wherein the anomaly detection model determines the anomaly score based on a feature map of the image obtained by the classification model.

9. The method of claim 8, wherein:

the classification model is a Bayesian convolutional neural network (CNN) model including a plurality of CNN models, and the feature map of the image is one of (i) a feature map obtained by a fixed one of the plurality of CNN models, (ii) a feature map obtained by a randomly selected one of the plurality of CNN models, and (iii) a feature map averaged over feature maps of at least a part of the plurality of CNN models.

10. The method of claim 1, wherein the classification model is a convolutional neural network (CNN) model or a Bayesian convolutional neural network (CNN) model.

11. The method of claim 10, wherein the segmentation model is a fully convolutional network (FCN) model.

12. The method of claim 1, wherein the object is one of a precision-machinery component, weld assembly, coated part, an intermediate product, and a semi-finished product during manufacturing.

13. An apparatus for automatic optical inspection, comprising:

an optical unit configured to capture an image of an object;

one or more processors; and one or more storage devices storing computer-executable instructions that, when executed, cause the one or more processors to perform the method of claim 1.

14. A computer system, comprising:

one or more processors; and one or more storage devices storing computer-executable instructions that, when executed, cause the one or more processors to perform the method of claim 1.

15. One or more non-transitory computer readable storage media storing computer-executable instructions that, when executed, cause one or more processors to perform the method of claim 1.

16. An apparatus for automatic optical inspection, comprising:

a classification module configured to classify an image of an object as one of a plurality of categories using a classification model;

a decision module configured to, in response to the image of the object being classified as a first category of the plurality of categories, label the image of the object as being qualified;

a segmentation module configured to, in response to the image of the object being classified as a second category of the plurality of categories, (i) determine a defect measurement by segmenting the image of the object using a segmentation model, and label the image as being qualified or unqualified based on the defect measurement; and an anomaly detection module configured to, in response to the image of the object being classified as a third category of the plurality of categories, (i) determine an anomaly score for the image of the object using an anomaly detection model and (ii) label the image as being qualified or unqualified based on the anomaly score.

17. The apparatus of claim 16, wherein the decision module is further configured to label the image as being unqualified if the category obtained by the classification module is a fourth category.

* * * * *